United States Patent
Martin et al.

(10) Patent No.: US 8,898,158 B2
(45) Date of Patent: Nov. 25, 2014

(54) SYSTEM AND METHOD FOR PROVIDING AN ENHANCED FACILITY PLAN

(75) Inventors: John Martin, Henley Beach South (AU); Andrew Roberts, Morphett Vale (AU)

(73) Assignee: Aconex Limited, Melbourne (AU)

( * ) Notice: Subject to any disclaimer, the term of this patent is extended or adjusted under 35 U.S.C. 154(b) by 83 days.

(21) Appl. No.: 13/636,671

(22) PCT Filed: Mar. 23, 2011

(86) PCT No.: PCT/AU2011/000326
§ 371 (c)(1),
(2), (4) Date: Sep. 21, 2012

(87) PCT Pub. No.: WO2011/116418
PCT Pub. Date: Sep. 29, 2011

(65) Prior Publication Data
US 2013/0013269 A1 Jan. 10, 2013

(30) Foreign Application Priority Data
Mar. 25, 2010 (AU) .................................. 2010901263

(51) Int. Cl.
*G06F 17/30* (2006.01)
*G06Q 10/00* (2012.01)

(52) U.S. Cl.
CPC ...................................... *G06Q 10/00* (2013.01)
USPC ............................................. 707/729; 703/1

(58) Field of Classification Search
None
See application file for complete search history.

(56) References Cited

U.S. PATENT DOCUMENTS

| 2003/0036983 | A1 | 2/2003 | Hougen et al. |
| 2004/0113937 | A1 | 6/2004 | Sawdey et al. |
| 2008/0077617 | A1 | 3/2008 | Schulz et al. |
| 2008/0183483 | A1 | 7/2008 | Hart |
| 2010/0066559 | A1* | 3/2010 | Judelson .................. 340/825.49 |
| 2011/0176179 | A1* | 7/2011 | Judelson ....................... 358/448 |

FOREIGN PATENT DOCUMENTS

| GB | 2407177 A | 4/2005 |
| WO | WO-03001468 A3 | 3/2003 |

* cited by examiner

*Primary Examiner* — Anteneh Girma
(74) *Attorney, Agent, or Firm* — Birch, Stewart, Kolasch & Birch, LLP

(57) ABSTRACT

A system and method for providing an enhanced facility plan includes receiving an asset list, electronic documents relating to one or more assets and an input image file for providing a visual representation of a facility plan including assets in the facility. The image file is scanned to automatically identify one or more asset tags having a corresponding asset tag entry in the asset list and for each identified asset tag, a position on the facility plan associated with the asset tag. A modified visual representation of the facility plan is provided as the enhanced facility plan, the modified visual representation including one or more added objects, each object having a relationship with an identified asset tag and having a location determined by the position associated with the related asset tag, wherein each object is selectable by a user to enable access to one or more of the electronic documents. The method may provide a convenient way of handing over information after construction of a facility.

16 Claims, 19 Drawing Sheets

SYSTEM AND METHOD FOR PROVIDING AN ENHANCED FACILITY PLAN

This application is the National Stage under 35 USC §371 of International Application PCT/AU2011/000326 filed Mar. 23, 2011, which claims priority under 35 USC §119(a)-(d) of Application No. 2010901263 filed in Australia on Mar. 25, 2010.

FIELD OF THE INVENTION

The present invention relates generally to methods, software and apparatus for providing a facility plan. In a typical application, the present invention may provide an enhanced facility plan suitable for hand over to a facility manager after construction of a facility, such as a building.

BACKGROUND TO THE INVENTION

The construction of a facility is a multidisciplinary process, involving architects, engineers, builders and contractors. Generally, a team responsible for designing the facility will prepare design documents, such as drawings, showing the layout of assets such as fixtures, fittings and equipment located in the facility. The drawings are used during construction to install the correct assets in the correct positions in the facility.

When construction has completed, the drawings are usually handed over to the facility manager, along with other documents relating to the assets installed in the facility. These documents may include user and/or maintenance manuals, test reports, photographs, warranty documents and the like. The drawings and documents may be used by the facility manager as an operation and maintenance tool for their facility.

The hand over process thus usually involves providing the facility manager with a "data-pack" comprising, for example, a collection of printed documents, CDs, DVDs and/or on-line document management systems. Hence, during a hand over process, the facility manager may receive an assortment of electronic files and printed documents, such as electronic drawings, plans, manuals, indexed electronic documents and indexed volumes of printed material. The diversity and structure of the documents may render the data pack difficult to use in an operational role, and thus make it difficult to locate a particular document required to manage the facility, resulting in time wastage.

In addition to the above, for facilities of even moderate complexity, the haphazard organisation of the documents may result in a lack of understanding of the overall facility. The haphazard organisation of documents may create a risk of non-compliance with government standards or other requirements.

Accordingly, there is a need for a method for providing information on facility hand over that addresses one or more of the above problems.

The above discussion of background art is included to explain the context of the present invention. It is not to be taken as an admission that any of the documents or other material referred to was published, known or part of the common general knowledge at the priority date of any one of the claims of this specification.

SUMMARY OF THE INVENTION

According to one aspect, the present invention provides a method of providing an enhanced facility plan, including:

receiving an asset list containing one or more asset tag entries, each asset tag entry associated with an asset, receiving one or more electronic documents, each electronic document relating to one or more assets, associating each electronic document with one or more asset tags, receiving an input image file for providing a visual representation of a facility plan including assets in the facility, scanning the input image file to automatically identify one or more asset tags having a corresponding asset tag entry in the asset list and for each identified asset tag, a position on the facility plan associated with the asset tag, and providing a modified visual representation of the facility plan as the enhanced facility plan, the modified visual representation including one or more added objects, each object having a relationship with an identified asset tag and having a location determined by the position associated with the related asset tag, wherein each object is selectable by a user to enable access to one or more of the electronic documents.

The method may provide a convenient way of handing information over to a facility manager. For example, a construction company may provide the enhanced facility plan to the facility manager after completion of construction of the facility.

In an embodiment, the input image file includes a CAD file, such as a drawing interchange format file (DXF), or a native format drawing file (such as a .DWG file). Thus the input image file may be a file which provides the visual representation of the facility plan when used with a CAD application. It is preferred that the input image file include vector based image files, where the images and their positions are stored in structured entities in the file. However, it envisaged that the present invention may be applicable to other types of image files.

The image file may be provided by an electrical, fire, hydraulic, pneumatic, mechanical or vertical transport subcontractor. Similarly, the asset list may be provided by a subcontractor, for example at the time of tendering for the contract. The one or more electronic documents may additionally be provided by the subcontractor, or may be obtained from a manufacturer of the particular asset.

Receiving an asset list, one or more electronic documents and an input image file may include, for each file, a user clicking on or browsing to a path where the file is saved. The files may then be loaded or copied locally, or the location of the files may be saved so that they can be accessed in place, without being copied. Alternatively, receiving a file may include receiving a weblink that may be used to access the file or receiving access to a database in which the file is stored. Of course, any other method of receiving the files may be used, as would be understood by the skilled addressee. By receiving the files, the method avoids time consuming data entry and the potential for mistyping details about assets.

The asset tags may include text, alphabetic characters, numerical characters, alphanumerical characters, symbols or the like. For example, the asset tag may include an acronym comprising characters from an asset name or type associated with the asset. It is possible that an asset tag may be include a property of a graphical representation of an asset on the facility plan. By way of example, an asset tag may include a name, number, label or other identifier for identifying a symbol or shape of a graphical representation of an asset. A suitable graphical representation may include, for example, a symbol or icon. However, it is preferred that each graphical representation includes a scaled graphical representation of the asset and that each asset tag be visible on the facility plan to identify a respective asset represented thereon.

An asset tag may represent a category of asset, a type of asset within the category, a particular physical asset or any other information related to an asset. For example, the asset list may have an entry for the asset tag "AHU G-1" (a type G-1 air handling unit), an electronic document may be associated with the asset tag "AHU" (the category "air handling unit units") and the input image file may contain asset tags "AHU G-1" and/or "AHU G-1:005" (respectively a type G-1 air handling unit, and an actual physical asset e.g. the 5$^{th}$ type G1 air handling unit in the facility).

Accordingly, references to "asset tags having a corresponding asset tag entry in the asset list" is to be taken to include asset tags that are actually listed in the asset list and also asset tags that are mapped, linked or otherwise associated with an asset tag listed in the asset list. In the example above, the asset tag "AHU G-1" identified in the image file may correspond to the asset tag entry for "AHU G-1" in the asset list. Also, the asset tag "AHU G-1:005" may correspond to the asset tag entry for "AHU G-1" in the asset list.

The added objects may include visible or hidden graphic elements, such as shapes or symbols. Alternatively, each added object may comprise a boundary identifying a respective region or location on the modified visual representation of the facility plan.

The added objects provide means for accessing electronic documents, for example that are associated with the related asset tag. The objects may also provide a means for accessing information about the asset identified by the related asset tag, such as a part number, description, category or the like for the identified asset. Thus, an enhanced facility plan including a plurality of added objects may thus provide an interactive tool for accessing comprehensive and diverse knowledge and information about the facility. Further examples of how the added objects may be used will be given below.

By scanning the input image file to automatically identify relevant asset tags, and a position associated with the identified asset tags, the method may potentially be performed faster and more accurately than a manual process of adding objects to a visual representation of the facility plan. The automatic identification of the tags is less error prone than manually adding assets as it is less likely that an asset will be missed. This may encourage use of the method by the construction company, to the benefit of the facility manager.

The facility plan may include a plan of a building, a group of buildings, a structure and/or a group of structures, an installation (such as an electrical installation), a network facility (such as a telecommunications network), transport infrastructure facilities (such as roadways or railways), utilities (such as water or electrical utilities), or the like. A building may include, for example, an office building, a hospital building, a residential dwelling, a sports centre, a school, a factory, a university. It will of course be appreciated that the present invention is applicable to a broad range of facilities.

Assets represented on the facility plan may include, for example, fixtures, fittings, furniture, plant and/or equipment, ducts, pipes, or wiring. For example, an asset may include a hot water service, a ventilation duct, a light fitting, a switchboard, an air conditioning unit, or motor pump. Each asset may belong to a particular service category, including, for example, electrical, fire, hydraulic, mechanical, pneumatic and/or vertical transport categories.

The enhanced facility plan may include an executable object, such as a stand alone executable program. A stand alone executable program may include a Windows Forms Application. Alternatively, the enhanced facility plan may include a digital file which is viewable using a viewing program or application, such as a third party program. A digital file for execution or viewing using a third party program may include an AutoCAD native format file, or other file that operates in conjunction with, or is viewable using, a third party program.

The position associated with the asset tag on the facility plan may be the position of the asset represented on the facility plan, or a position near the representation of the asset. Alternatively, if the asset tag is also represented on the facility plan, the position may be the position of the representation of the asset tag on the facility plan. The asset tag may be located on or near the representation of the asset, or away from the representation of an asset and possibly shown connected or linked to the asset tag using, for example, an arrow pointing to the asset.

In view of the above, it will be appreciated that for each identified asset tag, the position of each added object may depend on either the position of the asset tag or the position of the asset identified by the asset tag. For example, each added object may be positioned to coincide with the representation of the related asset, such as by positioning the added object "over" the representation of the related asset. Alternatively, if the asset tag is also represented on the facility plan, each added object may be positioned to coincide with the asset tag related to the added object, such as by positioning the added object "over" the asset tag.

The method may further include the step of storing information about the selected electronic documents in one or more databases, the information including one or more asset tags associated with each electronic document. The method may include linking or associating one or more databases with each added object. Each database preferably contains information associated with assets having asset tag entries in the asset list. Preferably, that information is obtained from a source of information, such as a document list. By storing information about the selected electronic documents in one or more databases and linking or associating a database(s) with each added object, information about assets may be readily accessible from an easily identifiable position on the facility plan.

Each added object may be selectable by a user to substantially immediately access one or more documents about the related asset. For example each added object may define a region on the modified visual representation of the facility plan that the user may interact with to activate further functionality. In one embodiment, the further functionality is activated by selecting the added object by "clicking on" the added object, or a region identified by the added object. In another embodiment, the further functionality is activated by hovering a pointer (such as a mouse pointer) over the added object or region. The object or region may be visible, for example, as a coloured rectangle, or it may be hidden or invisible. Where the object is invisible, the user may know its position, for example, because it corresponds to the position of the asset or the asset tag on the enhanced facility plan. For this description, either approach is to be understood as a user process which entails a user interacting with the enhanced facility plan to select an added object.

On selection of an added object by the user, the method may include querying the one or more of the databases, and providing the results of the query to the user. This may enable, for example, one or more documents, properties or other information associated with assets on the enhanced facility plan to be provided to the user in response to a user "selecting" an added object.

The method may further include the step of setting one or more properties for each added object according to properties provided in the asset list for the respective asset tag entry, and thus the asset identified by the asset tag. In this respect, an asset list may include a text file, electronic document, spreadsheet, or database table, which contains, for each listed asset and associated asset tag, asset properties associated with the asset identified by the asset tag, such as service category, part number, asset description, serial number, colour information, manufacturer information, supplier information and the like. Setting one or more properties for each added object according to properties provided in the asset list for the respective asset tag entry may improve user accessibility to information associated with the asset identified by the respective asset tag.

In one arrangement, a property set for the added object may be maintenance scheduling information, which may provide information on when maintenance for the related asset is due or remind the user to organise maintenance of the asset.

A query may be based on the asset tag related to the object, or it may involve a structured query, such as a filter based on one or more of the properties of the selected added object. This arrangement may provide a convenient way for the user to access properties or other information associated with a particular asset represented on the enhanced facility plan. For example, a user may select the object, for example, at the position of an asset tag in the enhanced facility plan, and may then be substantially immediately provided with one or more documents, properties or other information about that asset. The method may thus provide the user with asset properties or other information in a format which is easy to understand, identify and use.

The present invention may allow a user to access, for example, multiple drawings and documents via the enhanced facility plan. In other words, the enhanced facility plan may provide access to a repository of information about the facility via an interactive user interface. The ease of accessing information may assist in enabling a facility manager to meet operational, OH&S and essential services provisional maintenance requirements.

The one or more databases may be updated with new and revised manuals, photos, schematics, test reports and other electronic documents as they become available. This means that the information about the assets obtained by selecting the object may be kept up to date. For ease of updating, in some embodiments the databases may be made available via a web server that may service a number of queries from different users. Alternatively, the database may be stored locally, and modified or updated by a facility manager as required.

The enhanced facility plan may be provided electronically, without the need for manual hand over of printed documents, CDs or DVDs. This may provide cost savings, especially where there are tens of thousands of documents to be handed over. Hence, in an embodiment the enhanced facility plan may be a file for use with a CAD application. For example, the enhanced facility plan may include a native format CAD file.

In another embodiment, each database corresponds to a document category, and the method further includes:
  on selection of the object by the user, providing a choice of document categories; and
  on selection of a document category by the user querying the database corresponding to that document category and providing the results of the query to the user.

If there are numerous documents associated with an asset, such an embodiment may provide a way to more easily find documents of a particular category. The document categories may include one or more of manuals, photos, test reports or schematics for the asset. Again, the query may be a filter based on one or more of the properties set for the object.

As discussed above, an added object may define a region on the modified visual representation of the facility plan. The region may, for example, be a user selectable area.

The region may have a size depending on attributes of the asset tag. For example, the asset tags may be represented on the facility plan, and the size of the region may depend on one or more of: the width of the representation of the asset tag, and the height of the representation of the asset tag.

Alternatively, the region may have a size depending on the representation of the asset on the facility plan. For example the size of the region may depend on one or more of:
  the width of the representation of the asset on the facility plan; and
  the height of the representation of the asset on the facility plan.

The asset list may relate to a service category, and the method may further include:
  receiving a further asset list related to a different service category, the further asset list containing one or more asset tag entries, each asset tag entry associated with an asset,
  wherein scanning the input image file further includes automatically identifying one or more asset tags having a corresponding asset tag entry in the further asset list and for each identified asset tag, a position on the facility plan associated with the asset tag.

For example the service category may be one of and the further service category may be another of electrical, fire, hydraulic, mechanical, pneumatic or vertical transport. This embodiment is useful where multiple subcontractors are involved in constructing the facility, and provide separate asset lists and test reports related to their particular service category.

In another embodiment, the modified visual representation may be provided in response to an input by a user, in order to provide an indication to the user of the position in the facility plan of all asset tags associated with an asset tag entry in the asset list. In this embodiment, the objects need not be selectable. The objects may provide a visual indication of a particular asset, type of asset or model of asset in order to show the user where these assets are located in the facility.

According to another aspect, the present invention provides a method for providing an enhanced facility plan, including:
  obtaining an image file for providing a visual representation of the facility plan, the image file including one or more asset tags which identify assets represented on the facility plan;
  processing the image file to identify the asset tags having a corresponding asset tag entry in an asset list;
  for each identified asset tag, determining a position on the facility plan associated with the asset tag;
  providing a modified visual representation of the facility plan as the enhanced facility plan, the modified visual representation including one or more added objects, each object having a relationship with an identified asset tag and having a location determined by the position associated with the related asset tag;
  setting one or more properties for each object according to properties provided in the asset list for the respective asset tag entry;
  associating one or more databases with each object, each database corresponding to a document category, the databases containing information associated with assets having asset tag entries in the asset list.

Preferably the enhanced facility plan is an interactive facility plan such that on selection of an object by the user, the user is provided with a choice of document categories such that on selection of a document category by the user, the database corresponding to that document category is queried to provide the results of the query to the user.

According to another aspect, the present invention provides software for use with a computer including a processor and associated memory for storing the software, the software including a series of instructions executable by the processor to carry out the method in accordance with any one of the embodiments described above.

The invention also extends to a computer readable media containing the software, and apparatus for providing a facility plan including a processor, a memory, a user interface including an input device and an output device, and software resident in memory accessible to the processor, the software executable by the processor to carry out the method in accordance with any one of the embodiments described above.

BRIEF DESCRIPTION OF THE DRAWINGS

Embodiments of the present invention will now be described, by way of example only, with reference to the accompanying drawings. It is to be understood that the particularity of the drawings does not supersede the generality of the preceding description of the invention.

DETAILED DESCRIPTION OF AN EMBODIMENT

Example of a Network

Figure 1:
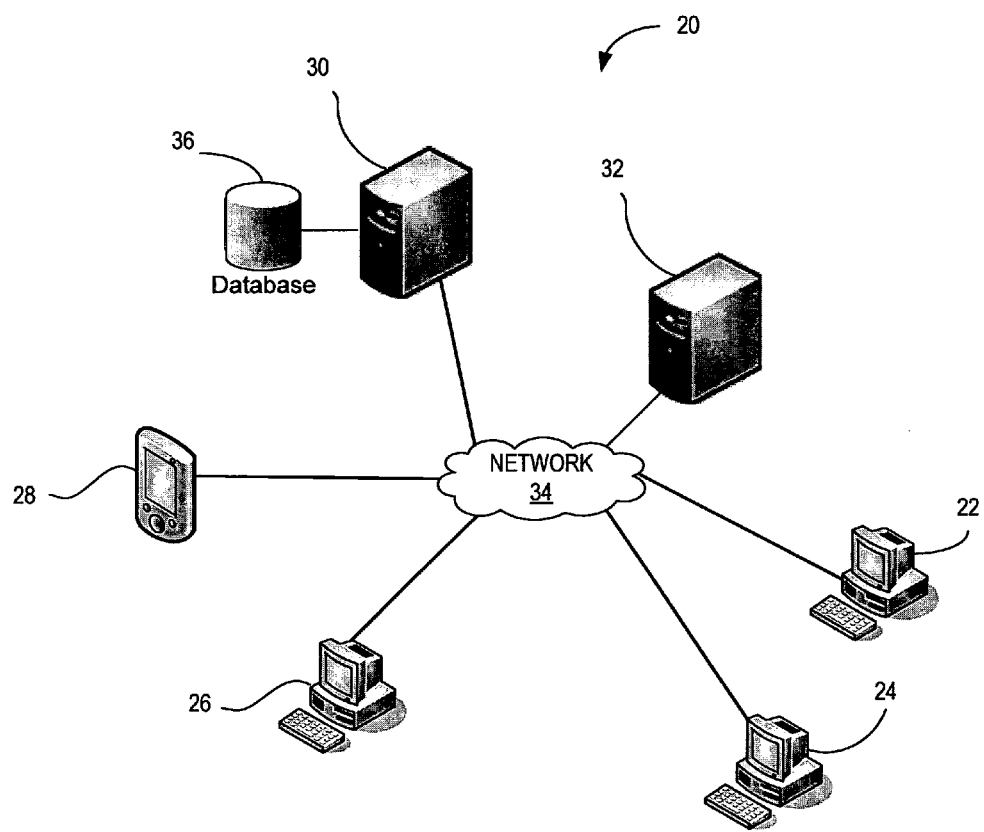
FIG. 1 is a schematic diagram of an example network that can be utilised to give effect to a method according to an embodiment of the invention.

Embodiments of the present invention can be realised over a network, an example of which is shown in FIG. 1. However, it is to be understood that it is not essential that the present invention be realised over a network since it could equally be implemented in a standalone processing system, such as on a desktop computer, a notebook computer or a hand held computer.

The network 20 shown in FIG. 1 includes one or more client processing systems and one or more server processing systems. In this example, the client processing systems include personal computers (PCs) 22, 24 and 26 and hand held device 28. The server processing systems include network servers 30 and 32. The client and server processing systems 22-32 are connected via the network 34.

The transfer of data over the network can be achieved using wired communication or wireless communication. The server processing systems 30 and 32 can facilitate the transfer of data between the network and one or more databases, such as database 36.

It will be appreciated that embodiments of the invention may be realised over different networks, such as a MAN (metropolitan area network), WAN (wide area network), LAN (local area network) or the internet. Also, embodiments need not take place over a network, and the method could occur entirely on a client or server processing system.

Example of a Processing System

Figure 2:
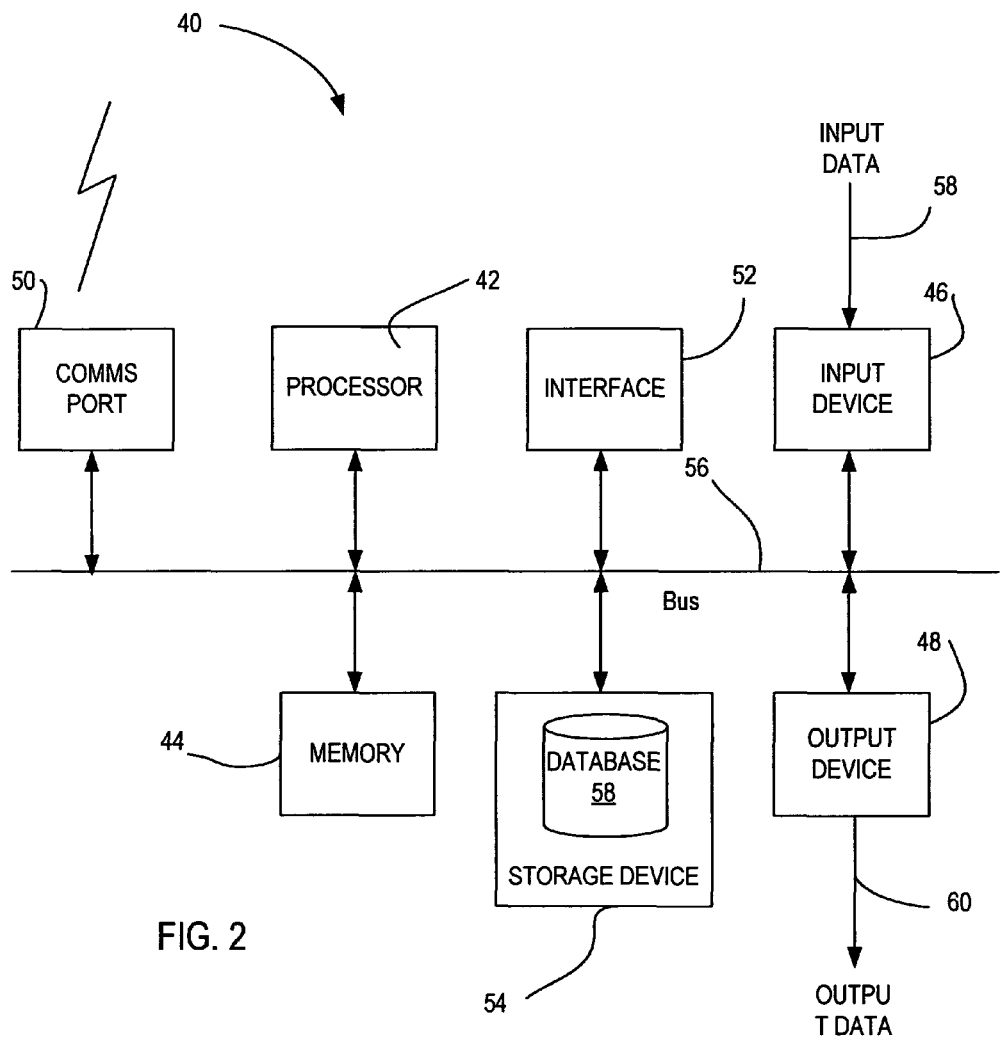
FIG. 2 is a functional block diagram of an example processing system that can be connected to the network.

The client and server processing systems 22-32 may include a processing system 40 shown in FIG. 2.

The processing system 40 includes a processor 42, a memory 44, at least one input device 46, at least one output device 48, a communications port 50, an interface 52 and a storage device 54. As is shown, the components of the processing system 40 are coupled together via a bus or group of buses 56.

The processor 42 may include more than one processing device, for example to handle different functions within the processing system 40.

The memory 44 may include any suitable memory device and including, for example, volatile or non-volatile memory, solid state storage devices, magnetic devices, etc. The memory 44 may store instructions for execution by the processor 42.

Input device 46 receives input data 58 and may include, for example, a keyboard, a mouse or other pointer device, a trackball, joystick or touch-screen, a microphone, a data receiver or antenna such as a modem or wireless data adaptor, data acquisition card, etc. An input device 46 may be operable by a user to enter input data 58, or it may receive data from another input data source.

Output device 48 produces or generates output data 60. Output device 48 may include a display device, a set of audio speakers, a printer, a port (for example a USB port), a peripheral component adaptor, a data transmitter or antenna such as a modem or wireless network adaptor, etc.

The storage device 54 can include any form of data or information storage means, for example, volatile or non-volatile memory, solid state storage devices, magnetic devices, etc. A file system and files may be stored on the storage device 54. The storage device 54 may house at least one database 59.

The communications port 50 allows the processing system 40 to communicate with other devices via a hard wired or wireless network, such as network 34.

The interface 52 couples the processing system 40 to one or more peripheral devices. For example interface 52 may include a PCI card or PC card.

In use, the processing system 40 can be adapted to allow data to be stored in and/or retrieved from the database 59 via the communication port 50.

The processing system 40 may be any form of terminal, server processing system, specialised hardware, computer, computer system or computerised device, personal computer (PC), mobile or cellular telephone, mobile data terminal, portable computer, Personal Digital Assistant (PDA), pager or any other similar type of device.

Overview of the Computer Software

Computer software for carrying out a method according to an embodiment of the invention may be stored in memory 44 and executed by the processor 42, for example of a personal computer 22. The software may include instructions to receive input data 58 and produce output data 60 as shown in FIG. 3.

Figure 3:
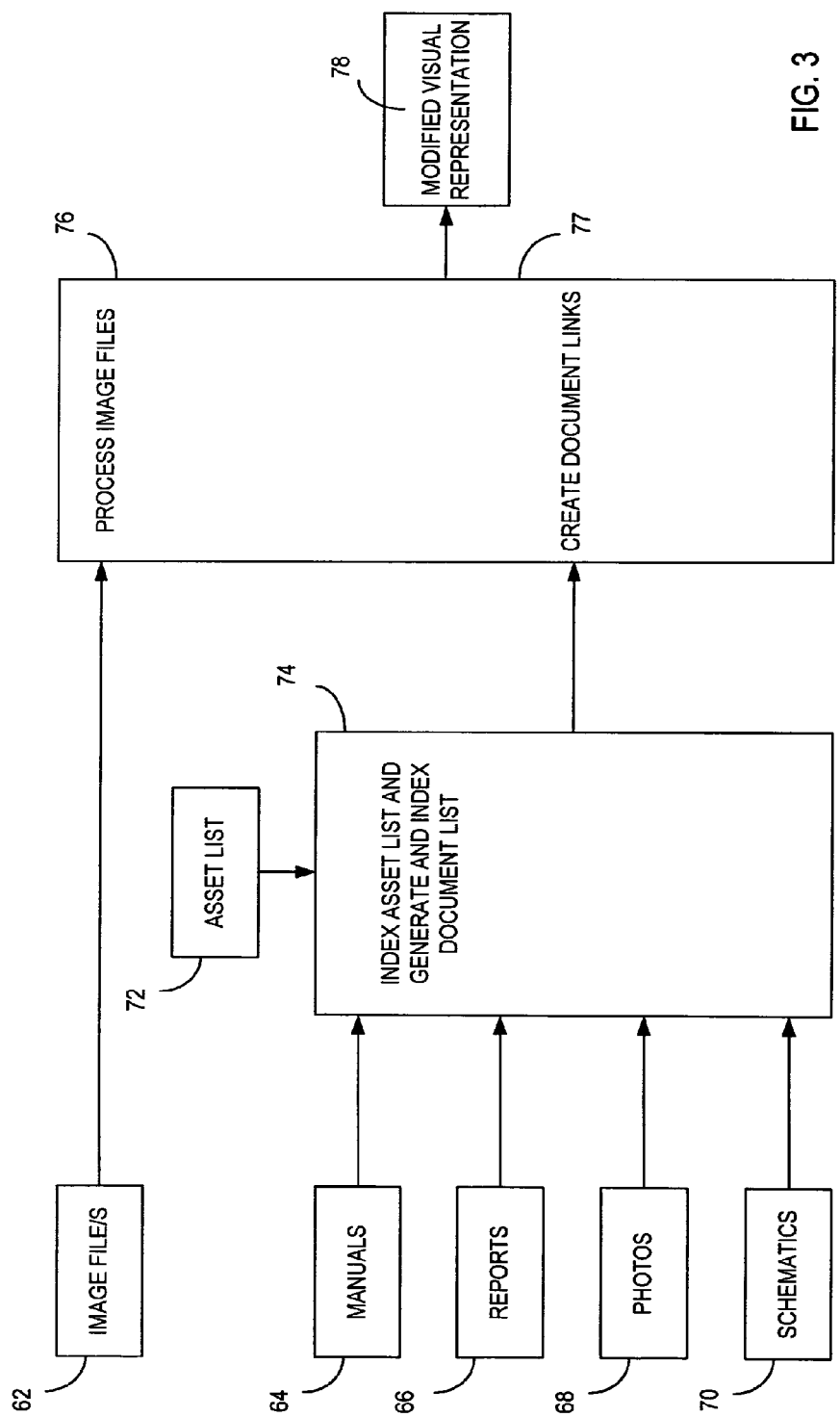
FIG. 3 is a flow chart showing the inputs and outputs of software in accordance with an embodiment of the invention.

With reference to FIG. 3, the input data 58 includes:
- an asset list 72 providing information about assets in a facility,
- electronic documents including manuals 64, reports 66, photos 68 and schematics 70 which are associated with the assets in the facility, and
- one or more image files 62 for providing a visual representation of a facility plan. The image file 62 includes one or more asset tags which identify assets represented on the facility plan.

In the present case, the asset list 72, the electronic documents 64-70, and image files 62 belong to a particular service category, such as electrical, fire, hydraulic, mechanical, pneumatic and vertical transport.

The input data 58 is processed as shown at steps 74, 76 and 77 of FIG. 3. At step 74, the documents 64-70 and asset list 72 are indexed in one or more databases, at step 77, links are created to save the location of each document. Steps 74 and 77 will be described in more detail below. At step 76, the image file 62 is scanned to automatically identify asset tags and provide the output data 60. The output data 60 comprises information for providing a modified visual representation 78 of the facility plan, the modified visual representation 78 including one or more added objects, each object having a relationship with an identified asset tag in the image file 62. In this embodiment, the objects are selectable and allow dynamic linking to the electronic documents 64-70. The processing of the image file 62 will be described in more detail below.

Asset List

Figure 4:
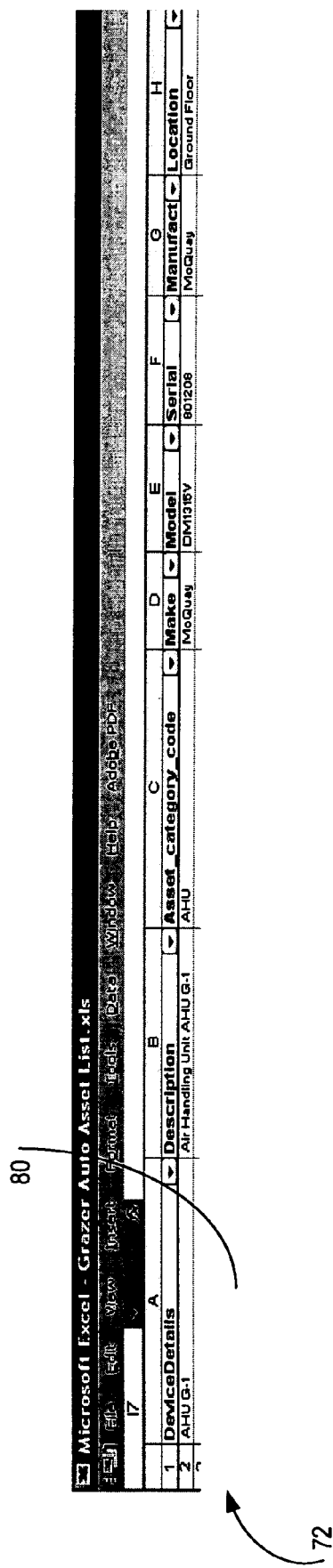
FIG. 4 is a screen shot of an asset list.

A screen shot of an example asset list 72 is shown in FIG. 4. Each asset is identified by an asset tag 80, which is a unique identifier for that asset. In the example shown in FIG. 4, an air handling unit is listed, having an asset tag of "AHU G-1". The asset list 72 also provides other properties about the asset, including "Description", "Asset_category_code", "Make", "Model", "Serial", "Manufacturer" and "Location". The "Asset_category_code" of the asset in the asset list 72 links the asset to a service, such as electrical, fire, hydraulic and mechanical. For example, the air handling unit has an "Asset_category_code" of "AHU" which links the unit to the air handling category, which itself is a subcategory of the mechanical service. In this example, the asset list 72 is provided in the form of a Microsoft Excel spreadsheet, however it will be appreciated that the asset list 72 could be provided in other formats.

Electronic Documents

Electronic documents 64-70 may include user and/or maintenance manuals, test reports, photographs, warranty documents and the like. The electronic documents 64-70 may be saved locally in the storage device 54 of a user's personal computer, or they may be saved remotely on one or more different web servers, and accessed, for example, using a http request.

Figure 5:
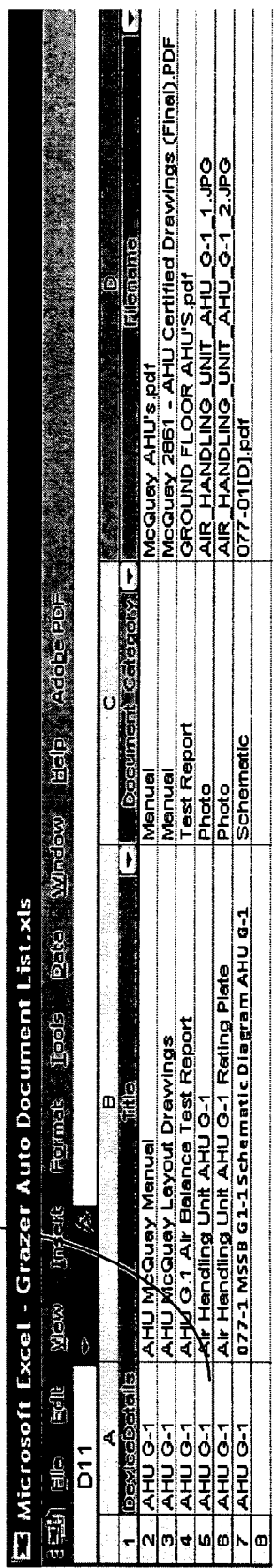
FIG. 5 is a screen shot of a document list.

To enable the electronic documents 64-70 to be indexed, a document list 82 is created, containing information about the electronic documents 64-70. A screen shot of an example document list 82 is shown in FIG. 5. When entering a new document, the user is asked to provide information to enable the document list 82 to be created. A new entry is created in the document list 82 for each asset that the document relates to. For example, if a document was relevant to five different assets, the document list 82 would contain five entries for that document, each entry linking the document to an asset tag for one of the five different assets.

In this example, all of the electronic documents are associated with the air handling unit identified by the asset tag "AHU G-1". In another example, the electronic document may relate to a more general asset tag "AHU". The document list 82 includes the following information: asset tag 84, "Title", "Document_Category" and "Filename" of the electronic document. The "Document_Category" of each electronic document in the document list 82 corresponds to one of manuals 64, reports 66, photos 68 and schematics 70. In this example, the document list 82 is provided in the form of a Microsoft Excel spreadsheet, however it will be appreciated that the document list 82 could be provided in other formats.

Document Linking

To enable access to the electronic document(s), a table of links is stored, linking an identifier for the document to its actual location. The identifier for the document may be allocated using a naming convention that includes the "Filename" of the document, and other identifying information. For example, the naming convention may specify that the document identifier incorporates the service, category code and asset name of the asset that the document relates to, as well as the "Filename" of the document. The document identifier is then linked to information enabling access to the electronic document. The information may, for example, be a web URL, a filepath or an IP address.

Image File

Figure 6:
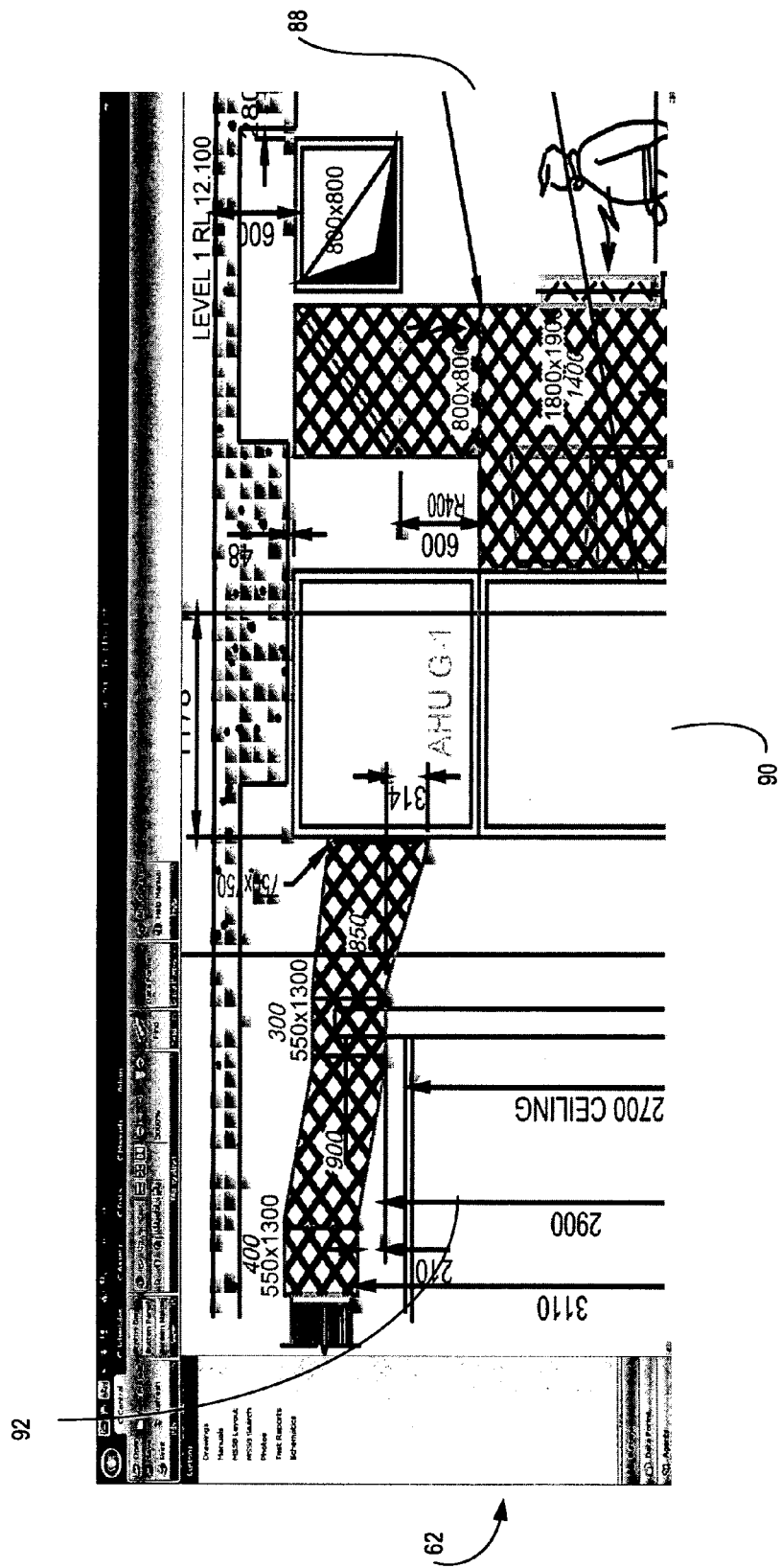
FIG. 6 is a screen shot of a visual representation of a facility plan.

A screen shot of an example image file 62 is shown in FIG. 6. The image file 62 provides a visual representation of the facility plan 88. The image file 62 may relate to a particular service, for example, the facility plan 88 shown in FIG. 6 relates to the mechanical service. An asset tag 90 is represented on the facility plan 88, which identifies an air handling unit "AHU G-1". The air handling unit is also represented on the facility plan as a box around the asset tag 90. Other assets are also shown on the facility plan 88, for example, air conditioning duct 92, as well as measurements of the assets and the boundaries of the structure of the building. In this example, the image file 62 is a CAD drawing having a DWG or DXF file format, and the asset tag 90 is a text entity having the value "AHU G-1". However it will be appreciated that the image file 62 and asset tag 90 could be provided in other formats.

Indexing Asset List and Document List into Databases

Figure 7:
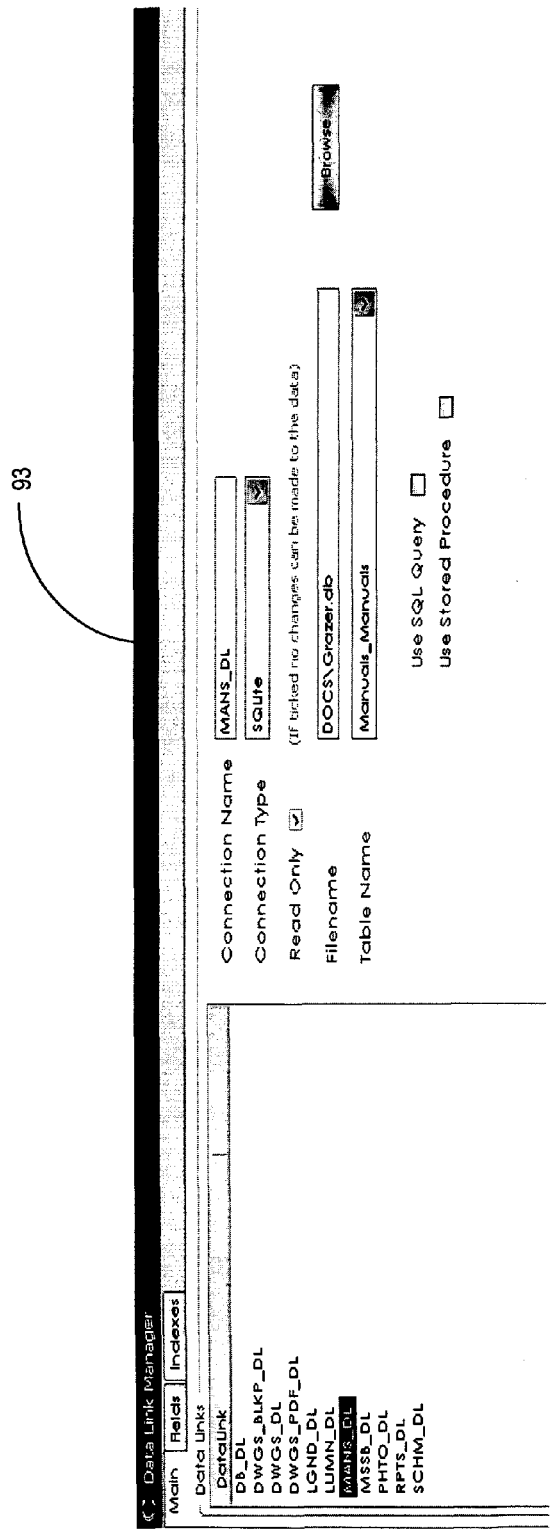
FIG. 7 is a screen shot of a window providing information about a database.

A series of databases store information about assets relating to a particular service and associated electronic documents. In this example, the databases relate to the mechanical service and there is one database for each category of document—for example, FIG. 7 shows a window 93 displaying information about a database named "MANS_DL" for storing information about manuals. There is also an asset list database to store properties of the assets.

Each database has a number of fields that are searchable to retrieve information from the database. For example, the "MANS_DL" database includes the fields "DeviceID, Description" and "File". The asset list database includes the fields "Device", "Description", "DeviceType", "Manufacturer" and "Model".

The databases may be stored locally, for example on personal computer 22, or may be stored on a server, for example server 30 shown in FIG. 1. Storing the databases on a server allows the use of a single set of databases to respond to queries from multiple instances of the software.

A wizard, as shown in FIGS. 8 to 12, may be provided to simplify the process of indexing documents 64-70 and asset list 72 in the databases.

Figure 8:
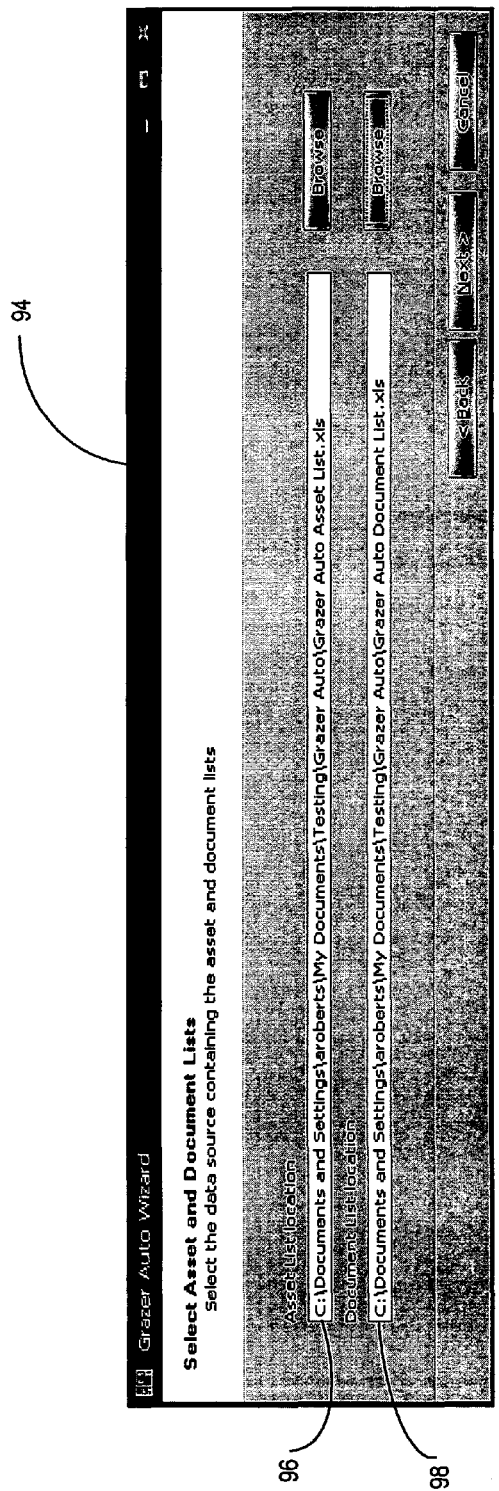
FIGS. 8 to 12 are screen shots of a wizard for uploading an asset list and a document list and storing them in one or more databases.
Figure 9:
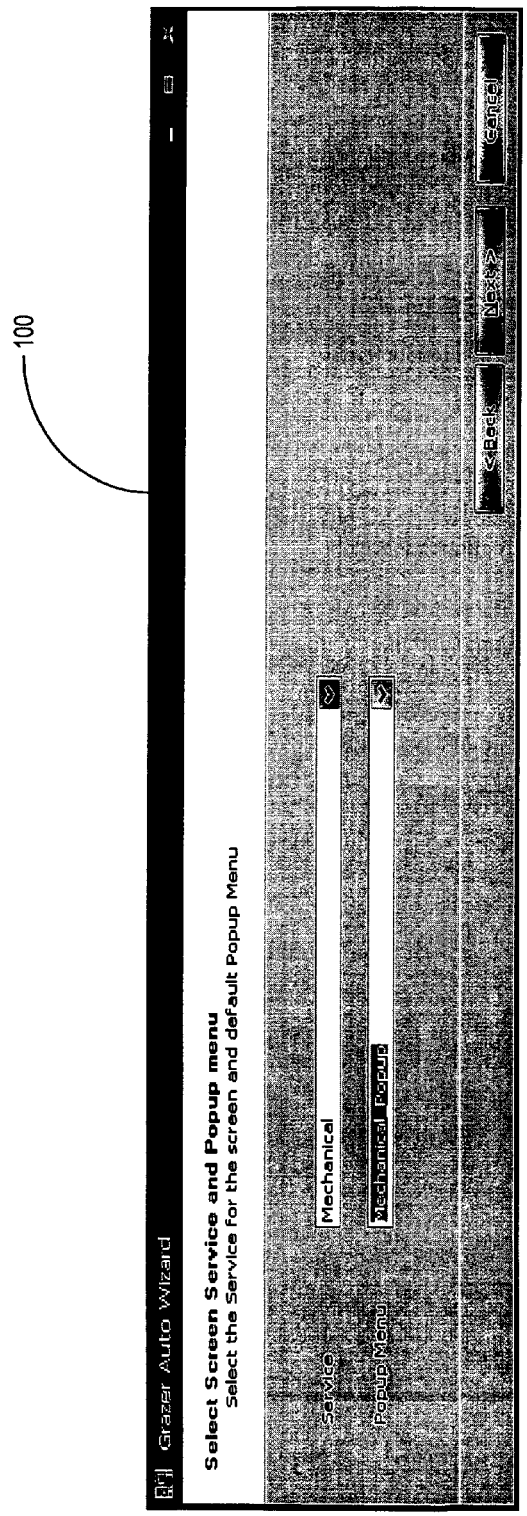

The user is first presented with a dialog box 94 shown in FIG. 8, prompting the user to enter the filepath 96 of the asset list 72 and the filepath 98 of the document list 82. Another dialog box 100 is then presented as shown in FIG. 9, asking the user to select the service that the image file 62 relates to, and the style of popup menu. The selection of a particular service sets default settings such as background colour, font size and colour. The selection of a particular style of pop up menu sets the categories of electronic documents that will be linked to assets of that service. The menu also defines which databases will be associated with assets of that type of service, as each category corresponds to a different database. In the example shown in FIG. 9, the mechanical service and mechanical popup menu have been selected.

Figure 10:
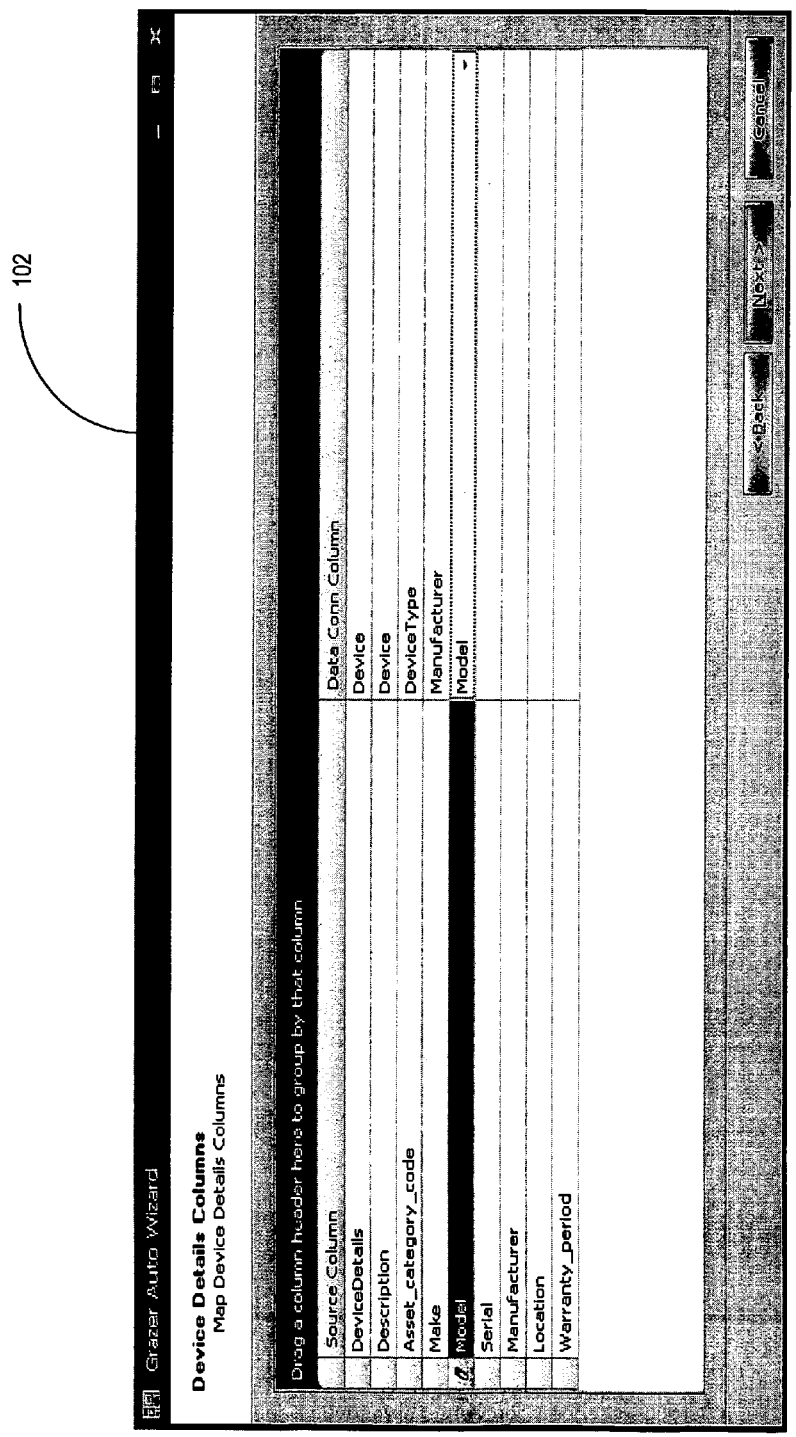
Figure 11:
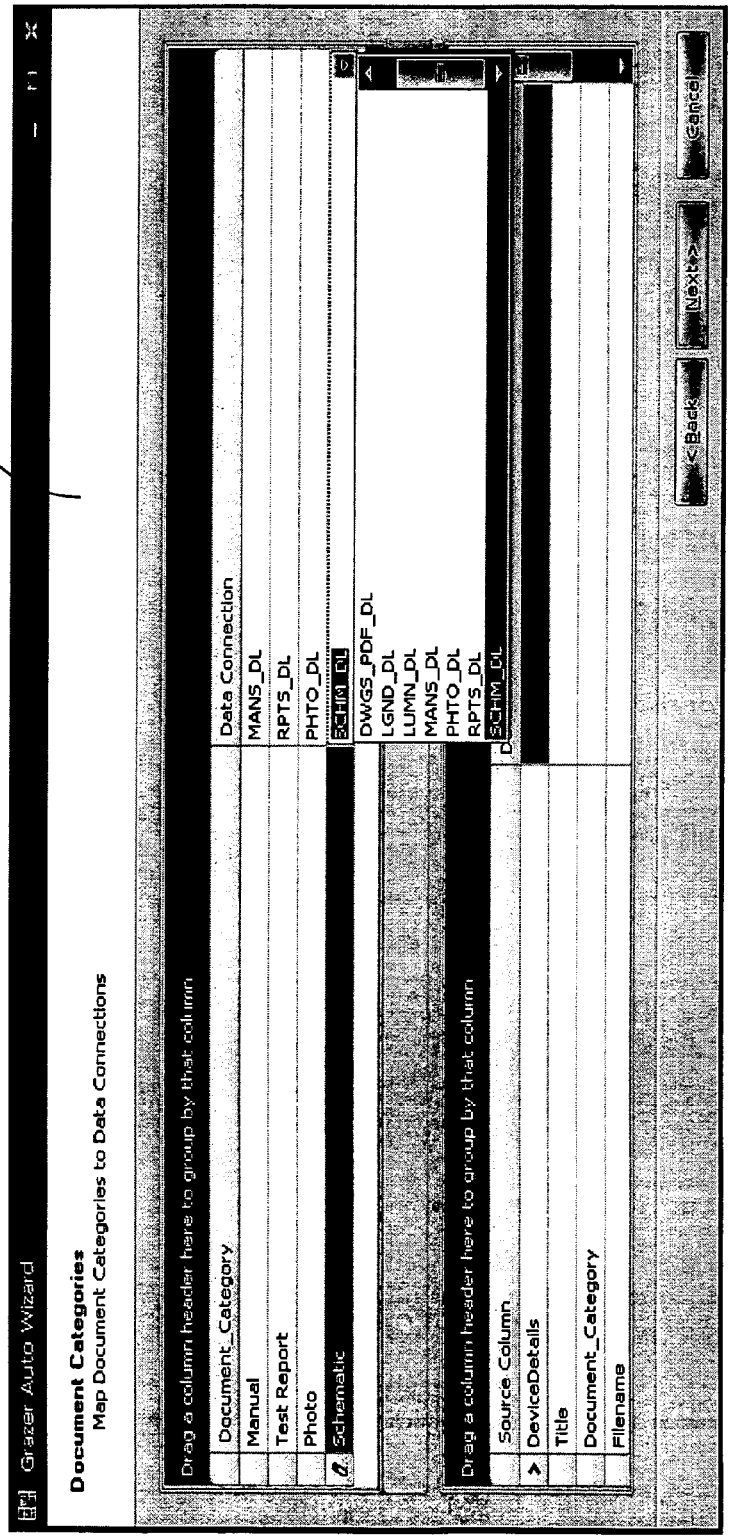
Figure 12:
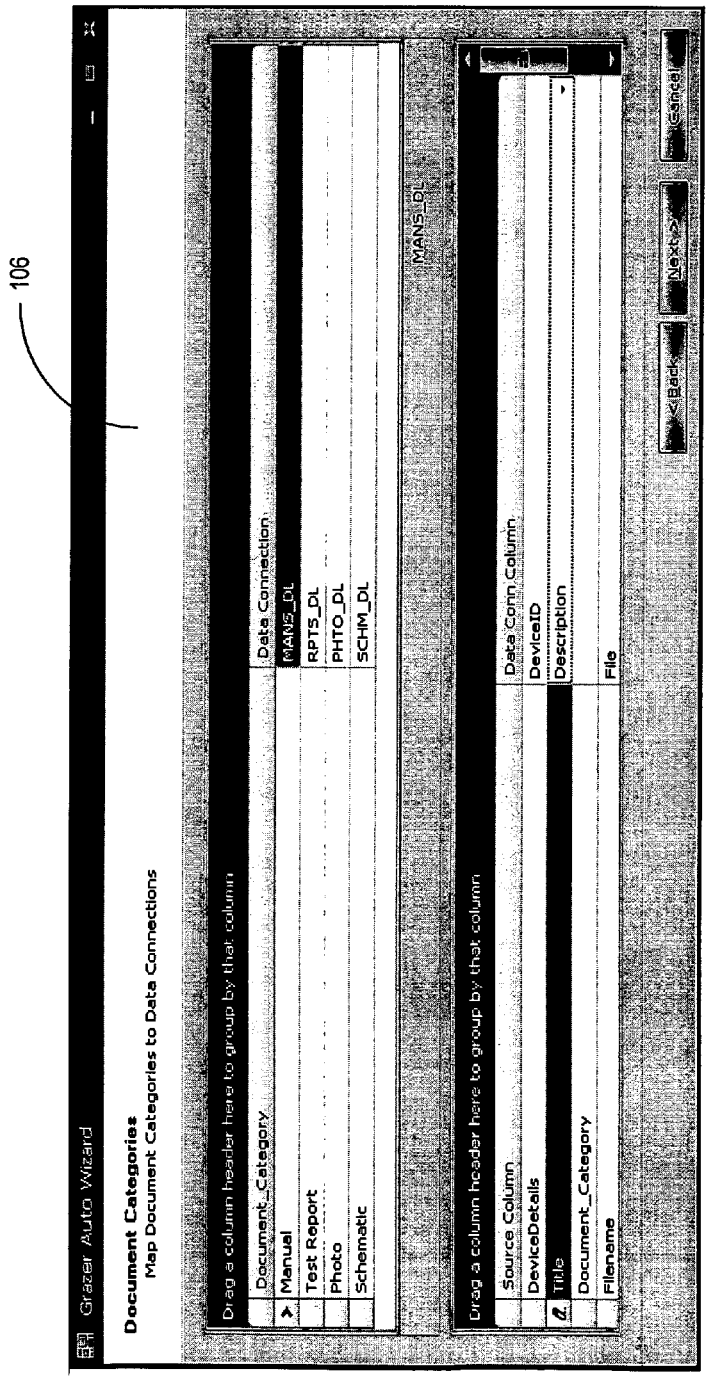

The user is then presented with a series of three windows, shown in FIGS. 10 to 12, for mapping fields in the asset list 72 and values and fields in the document list 82 into fields in the databases. These windows are used to ensure that the information from the asset list 72 and document list 82 are stored correctly in the databases. After the mapping is completed, the databases are automatically populated with the information.

The window 102 of FIG. 10 shows fields from the asset list 72 that have been mapped by the user to fields in the asset list database. For example, the field "Asset_category_code" in the asset list 72 has been mapped to the field "DeviceType" in the asset list database, and the field "Make" in the asset list 72 has been mapped to the field "Manufacturer" in the asset list database.

When the asset list database is populated with information from the asset list 72, the properties of the air handling unit "AHU G-1" are indexed into the asset list database according to this mapping. For example, the property "AHU" from the field "Asset_category_code" in the asset list 72 will be stored in the field "DeviceType" in the asset list database, and the property "McQuay" from the field "Make" in the asset list 72 will be stored in the field "Manufacturer" in the asset list database.

The window 104 of FIG. 11 shows the user mapping the "Document_category" values in the document list 82 to different databases. This allows information about the electronic documents to be grouped into databases based on their category. FIG. 11 shows the category "Manual" linked to the database "MANS_DL", "Test Report" linked to the database "RPTS_DL", "Photo" linked to the database "PHTO_DL" and "Schematic" linked to the database "SCHM_DL".

When the databases are populated with information from the document list 82, the information about the manuals "AHU McQuay Manual" and "AHU McQuay Layout Drawings" will be stored in the MANS_DL database, the information about the test report "AHU G.1 Air Balance Test Report" will be stored in the RPTS_DL database, the information about the photos "Air Handling Unit AHU G-1" and "Air Handling Unit AHU G-1 Rating Plate" will be stored in the PHTO_DL database, and the information about the schematic "077-1 MSSB G1-1 Schematic Diagram AHU G-1" will be stored in the SCHM_DL database.

The window 106 of FIG. 12 shows the mapping, within a document category, of fields in the document list 82 to fields in the database for that document category. For example, the field "Filename" in the document list 82 has been mapped to the field "File" in the relevant database. Again, this will ensure that the information from the document list 82 is mapped to the correct field in the relevant database.

Providing a Modified Visual Representation of a Facility Plan

Figure 13:
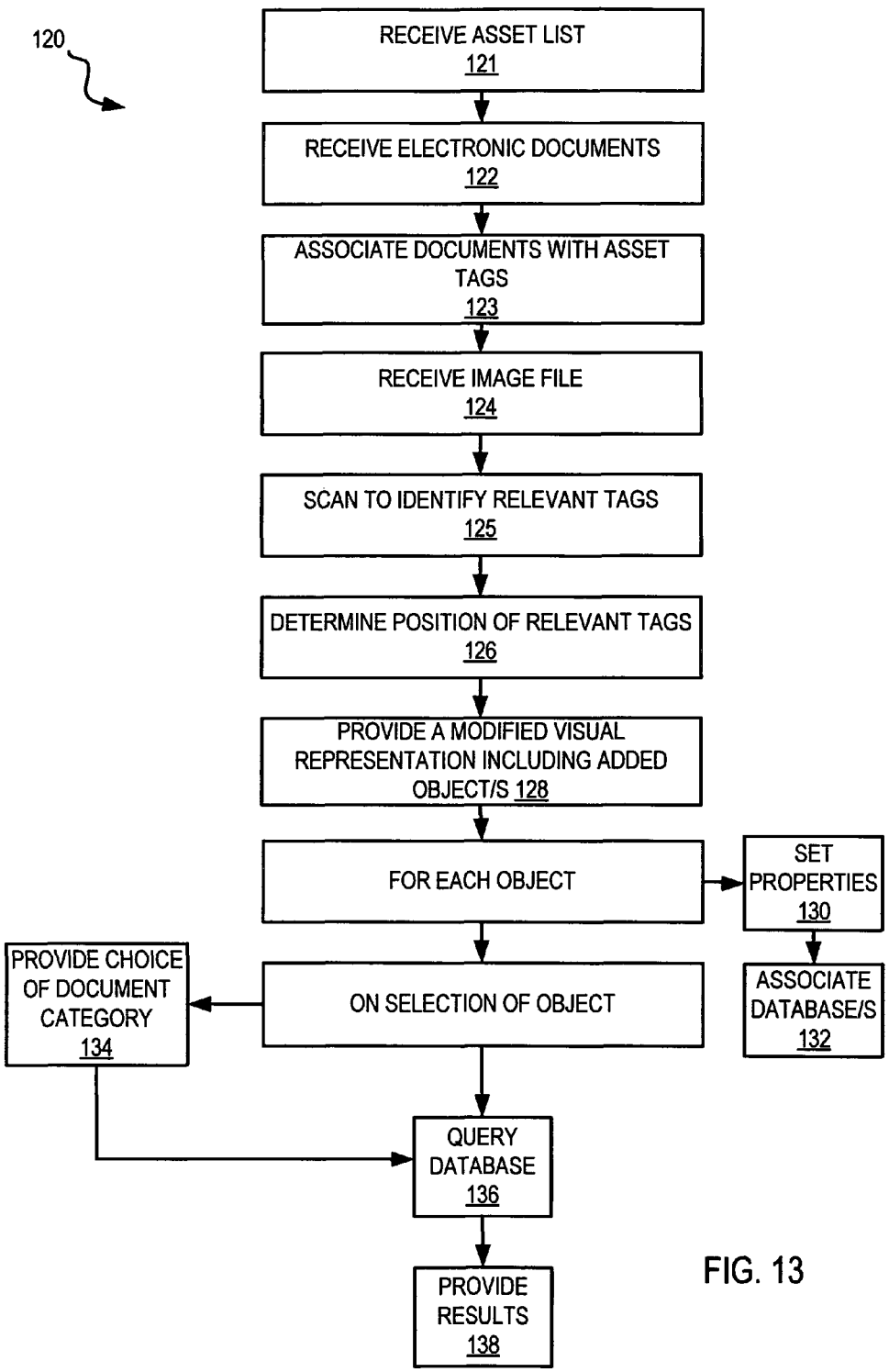
FIG. 13 is a flow chart showing a method for providing a facility plan in accordance with an embodiment of the invention.

Once the databases have been populated, the information stored in the databases can be used to provide a modified visual representation of the facility plan. FIG. 13 shows a method 120 for providing an enhanced facility plan according to one embodiment of the invention.

At step 121, the software receives an asset list 72 containing one or more asset tag entries. At step 122, the software receives one or more electronic documents 64-70 and at step 123 associates the electronic documents with one or more asset tags as described above. At step 124 the software receives an image file 62, for example a CAD file as shown in FIG. 6. The image file 62 may be received, for example, by the user providing the filepath to the image file 62. As described above, the image file 62 includes one or more asset tags (in this case text entities) which identify assets represented on a facility plan.

At step 125, the software scans the image file 62 to automatically identify one or more asset tags having a corresponding asset tag entry in the asset list 72. In this example, the software identifies asset tag 90, which is a text entity "AHU G-1" that corresponds to the asset tag entry for "AHU G-1" in the asset list database.

At step 126, the software determines a position in the facility plan 88 associated with each identified asset tag (i.e. asset tag 90). In this case, the position is the x, y, z coordinates of the asset tag 90. The position may also include matrix transformation information, and if the image file 62 includes nested blocks, information about the block associated with the asset tag 90. The position information may be obtained by scanning or parsing the image file 62.

The software also identifies other entities in the image file 62, which define other graphical elements of the facility plan 88, such as boundary lines, representations of assets, text showing measurements etc. These entities are used to create a model of the facility plan 88. This model can be used to create a graphics object.

Figure 14:
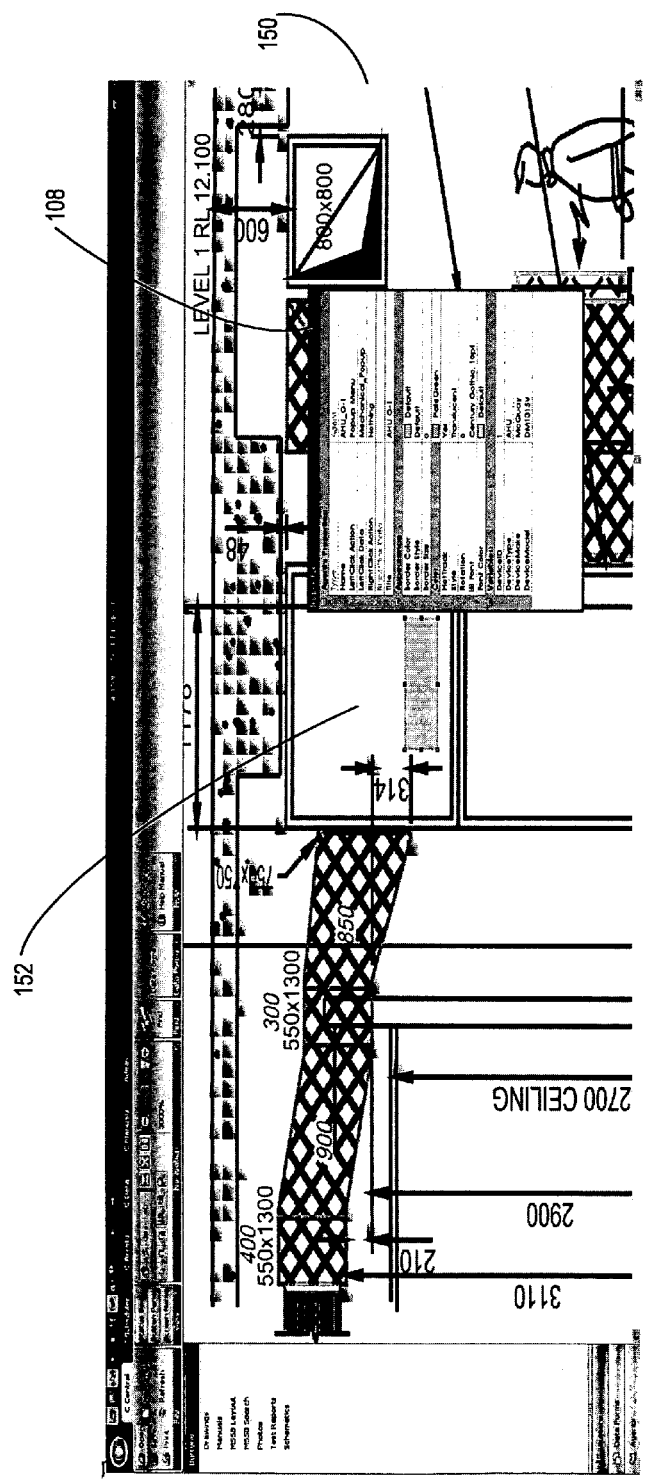
FIG. 14 is a screen shot of a modified visual representation of the facility plan of FIG. 6, the modified visual representation including an added object.

The software then provides a modified visual representation 150 of the facility plan 88, as shown in FIG. 14 (step 128). The representation 150 is created by rendering the graphics object to the screen. It is thus possible to view, pan and zoom the representation 150 without requiring the third party software that was used to create the original drawing, such as AutoCAD.

The modified visual representation 150 includes an added object 152 having a relationship with the asset tag 90. The added object 152 is located at a position on the facility plan directly over the representation of the asset tag 90. In this embodiment, the object 152 is a rectangle object that defines a region that is user selectable. The size of the region is defined by the width and height of the representation of the asset tag 90.

Figure 15:
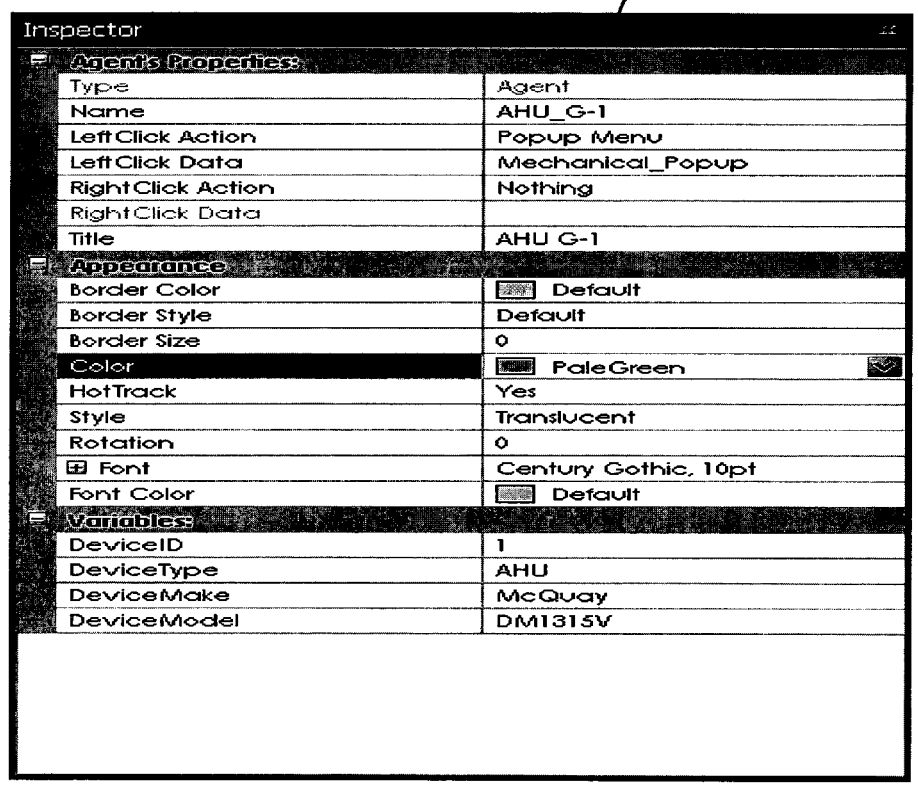
FIG. 15 is a screen shot of a window showing properties set for the object shown in FIG. 14.

The software then sets properties for the object 152 at step 130, according to properties provided in the asset list 72 and stored in the asset list database for the asset tag entry "AHU G-1". These properties are displayed in box 108 shown in FIGS. 14 and 15, and include "DeviceID", "DeviceType", DeviceMake" and "DeviceModel".

Other properties for the object 152 are also predefined, based on the user's selection in the dialog box 94 shown in FIG. 8 of a mechanical service and a mechanical pop up menu. These properties include the appearance of the object 152, and the action on the occurrence of different events, such as right and left click on the user selectable region. As shown in Box 108, left click is set to display the mechanical pop up menu.

The software also associates the mechanical databases with the object 152 at step 132, based on the user's previous selection of a mechanical service.

The modified visual representation 150 can be provided to a facility manager to access electronic documents relating to assets in the facility. The modified visual representation 150 may be provided to the facility manager via a network 34, on a computer readable media such as a CD, DVD, USB flash drive, external hard drive, or on a programmed apparatus, such as a personal computer or hand held device having a processing system 40 as shown in FIG. 2.

Using the Enhanced Facility Plan to Access Electronic Documents

The facility manager or other user can interact with the enhanced facility plan to access electronic documents relating to assets in the facility.

Figure 16:
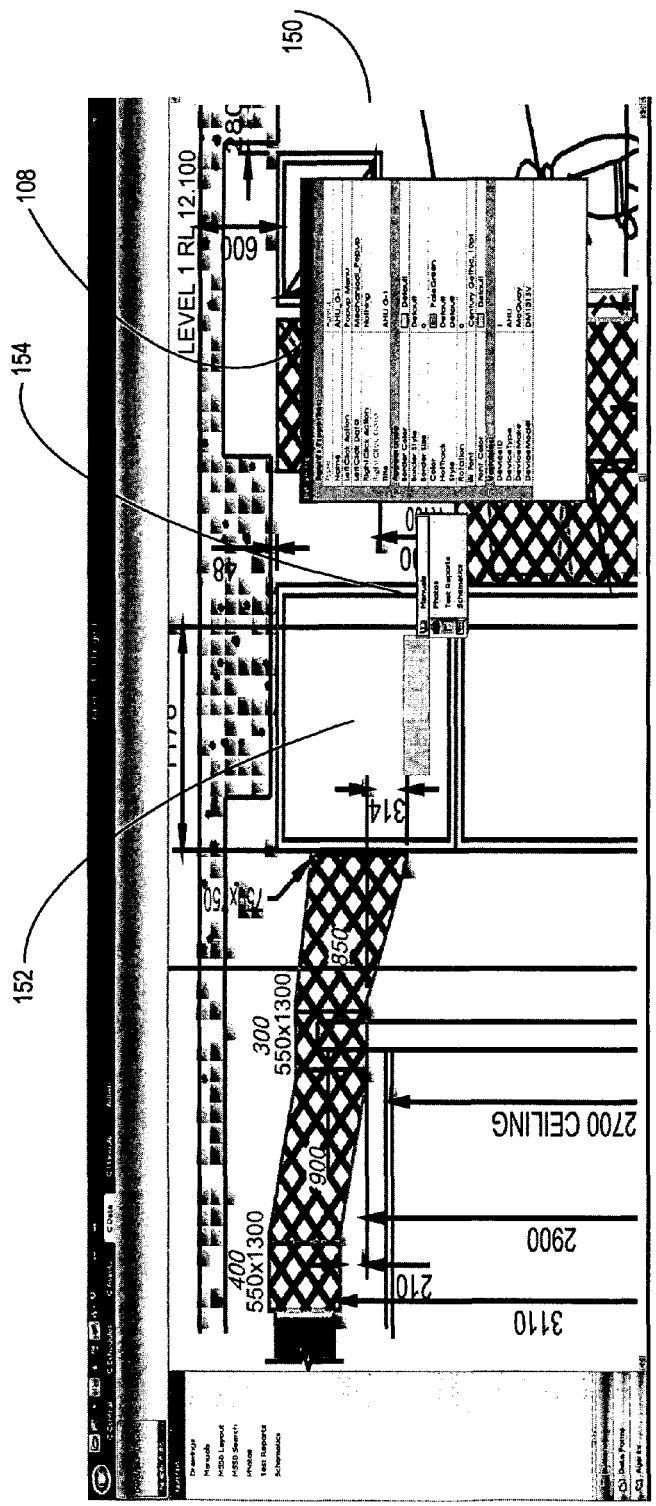
FIG. 16 is a screen shot of the modified visual representation of FIG. 14, with a menu providing a choice of document categories.

FIG. 16 is a screen shot of the modified visual representation 150 (in other words, the enhanced facility plan) after the user has left clicked on the user selectable region defined by the object 152. A "mechanical" pop up menu 154 is displayed, which provides the user with a list of possible document category selections—manuals, photos, test reports or schematics (step 134 of FIG. 13). Each category of electronic documents corresponds to a different database.

Figure 17:
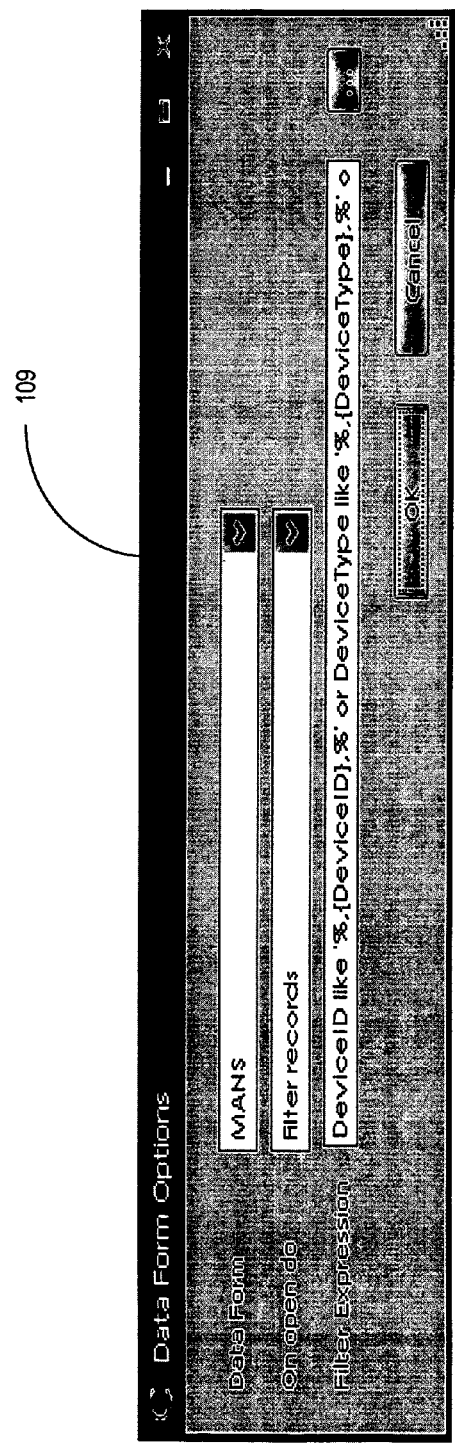
FIG. 17 is a screen shot of a window showing a query which is a filter based on the properties set for the object.

On selection of a category in the pop up menu 154, at step 136, the database corresponding to that category is queried by use of a data form. The query is a filter based on the properties set for the object 152. For example, the window 109 displayed in FIG. 17 shows that on selection of "manuals", the "MANS_DL" database is queried using a filter based on properties including "DeviceID" or "DeviceType".

Figure 18:
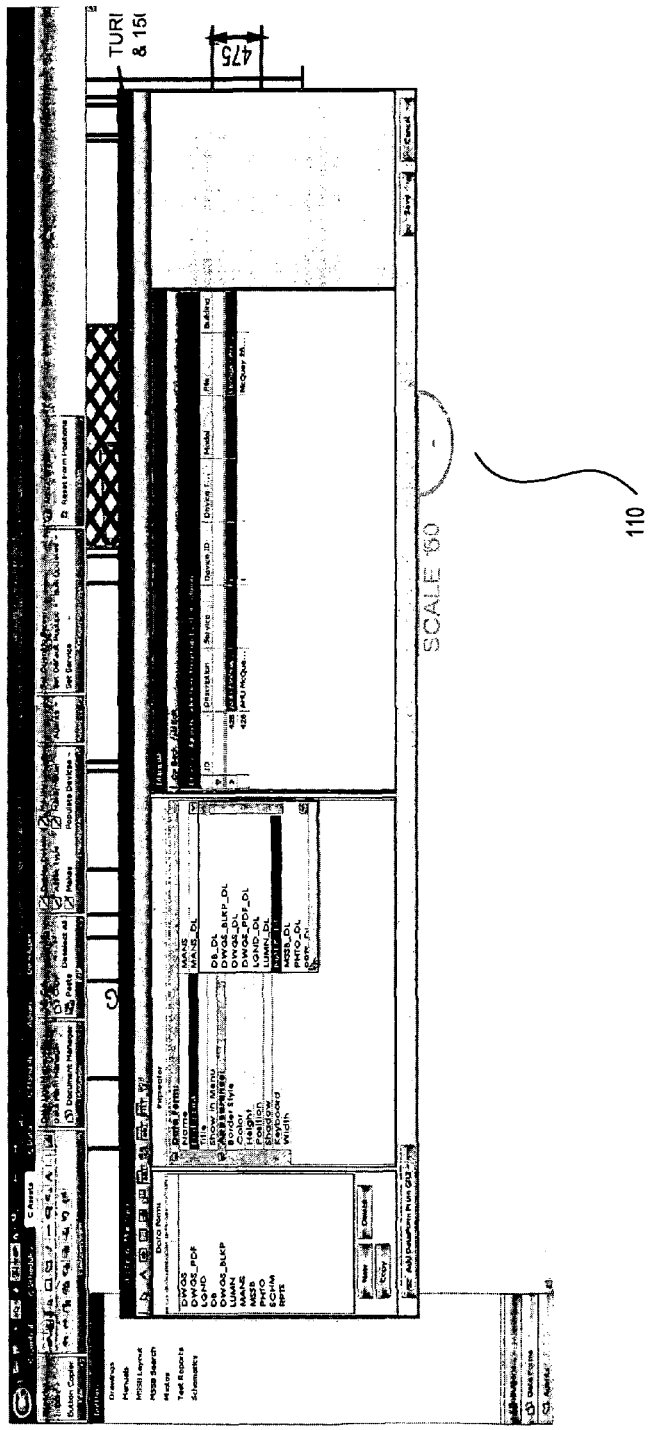
FIG. 18 is a screen shot of a window showing the results of the query of FIG. 17.
Figure 19:
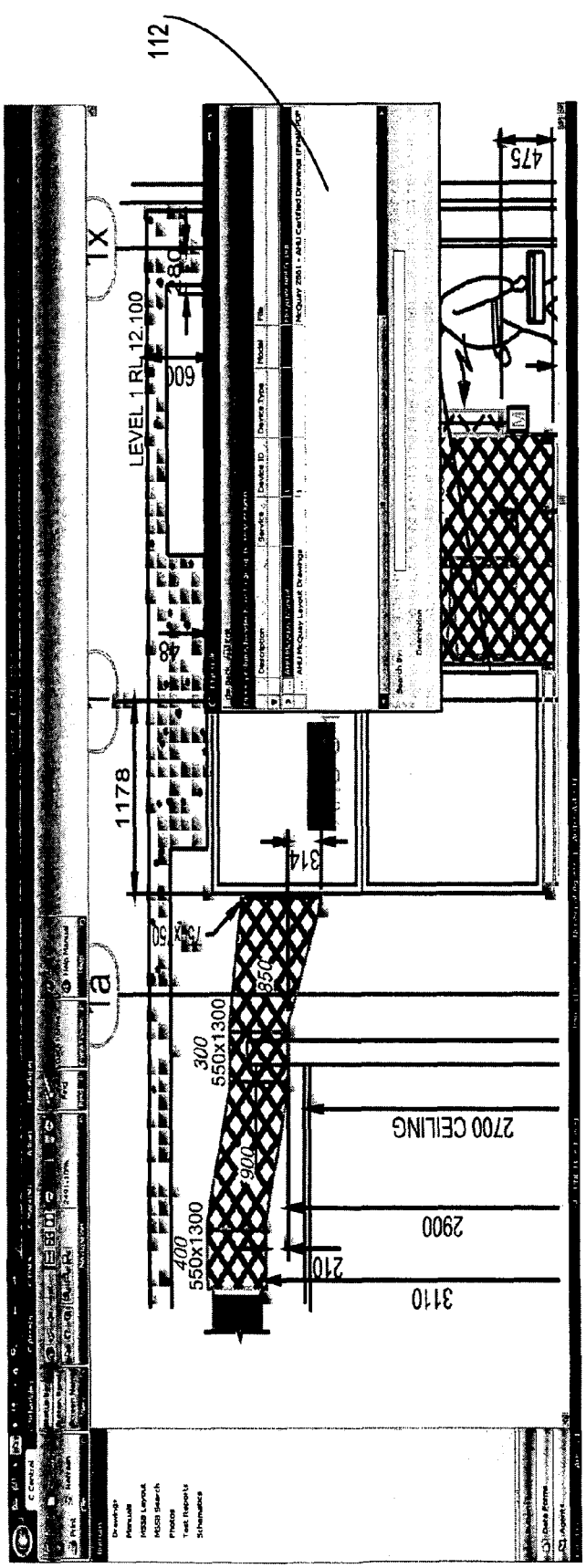
FIG. 19 is a screen shot of the modified visual representation of FIG. 14, providing the results of the query.

In response to the query, two electronic documents "AHU McQuay Manual" and "AHU McQuay Layout Drawings" are identified, as shown in the window 110 of FIG. 18. At step 138, the results of the query are provided to the user in box 112, as shown in FIG. 19. The electronic documents may be accessed by clicking on the relevant listing in the box 112.

Clicking on the listing of the electronic document causes the table of links to be searched to find the actual location of the document. As discussed above, the table of links stores links between an identifier for the document and its actual location. For the purpose of searching the table of links, the identifier for the document may be constructed using the "Filename" and the service, category code and asset name that the document relates to. The identifier may then be used to obtain the actual location of the document and thereby access the document.

The modified visual representation 150 may also be used to provide an indication to the user of the position in the facility plan of all asset tags associated with an asset tag entry. For example, a user may be presented with a list of asset types available for selection. The available asset types may be determined based on the objects added to the modified visual representation 150. Selecting an asset type in the list may cause the objects having a relationship with asset tags of that type to be highlighted on the facility plan. For example, selecting "air handling units" may cause all objects having asset tags with the "Asset_category_code" of "AHU" to be displayed.

It is to be understood that various alterations, additions and/or modifications may be made to the parts previously described without departing from the ambit of the present invention, and that, in the light of the above teachings, the present invention may be implemented in software, firmware and/or hardware in a variety of manners as would be understood by the skilled person.

The invention claimed is:

1. A computer implemented method of providing an enhanced facility plan, the computer having one or more processors, a memory, and an interface, comprising:
   receiving into the memory an asset list containing one or more asset tag entries, each asset tag entry associated with an asset,
   receiving into the memory one or more electronic documents, each electronic document relating to one or more assets,
   associating, by the one or more processors, each electronic document with one or more asset tags,
   receiving into the memory an input image file for providing a visual representation of a facility plan including assets in the facility,
   scanning, by the one or more processors, the input image file to automatically identify one or more asset tags having a corresponding asset tag entry in the asset list and for each identified asset tag, a position on the facility plan associated with the asset tag, and
   providing, via the interface, a modified visual representation of the facility plan as the enhanced facility plan, the modified visual representation including one or more added objects, each object having a relationship with an identified asset tag and having a location determined by the position associated with the related asset tag, wherein each object is selectable by a user to enable access to one or more of the electronic documents.

2. The method of claim 1, further including:
   storing information in the memory about the selected electronic documents in one or more databases, the information including one or more asset tags associated with each electronic document.

3. The method of claim 2, further including:
   on selection of the object by the user, querying by the one or more processors one or more of the databases, and providing the results of the query to the user.

4. The method of claim 2, wherein each database corresponds to a document category, further including:
   on selection of the object by the user:
      providing a choice of document categories; and
      on selection of a document category by the user:
         querying by the one or more processors the database corresponding to that document category and providing the results of the query to the user.

5. The method of claim 4, wherein the document categories include one or more of manuals, photos, test reports or schematics for the asset.

6. The method of claim 2, wherein the asset tag entry in the asset list includes properties associated with the asset identified by the asset tag, further including:
   setting one or more properties for each object according to properties provided in the asset list for the respective asset tag entry,
   wherein the query is a filter based on one or more of the properties set for the object.

7. The method of claim 1, wherein each object defines a region having a size depending on attributes of the asset tag or the representation of the asset on the facility plan.

8. The method of claim 7, wherein the region is a user selectable area.

9. The method of claim 7, wherein the asset tags are represented on the facility plan, and wherein the size of the region depends on one or more of:
the width of the representation of the asset tag; and
the height of the representation of the asset tag.

10. The method of claim 1, wherein the asset tags are represented on the facility plan and wherein each object on the facility plan is positioned directly over the representation on the facility plan of the asset tag associated with the object.

11. The method of claim 1, wherein the asset list relates to a service category, further including:
receiving a further asset list related to a different service category, the further asset list containing one or more asset tag entries, each asset tag entry associated with an asset,
wherein said scanning the input image file further includes automatically identifying one or more asset tags having a corresponding asset tag entry in the further asset list and for each identified asset tag, a position on the facility plan associated with the asset tag.

12. The method of claim 11, wherein the service category is one of and the further service category is another of electrical, fire, hydraulic, mechanical, pneumatic or vertical transport.

13. A computer implemented method of providing an enhanced facility plan, the computer having one or more processors and a memory, comprising:
obtaining into the memory an input image file for providing a visual representation of a facility plan, the image file including one or more asset tags which identify assets represented on the facility plan;
processing by the one or more processors, the input image file to identify the asset tags having a corresponding asset tag entry in an asset list;
for each identified asset tag, determining, by the one or more processors, a position on the facility plan associated with the asset tag;
providing a modified visual representation of the facility plan as the enhanced facility plan, the modified visual representation including one or more added objects, each object having a relationship with an identified asset tag and having a location determined by the position associated with the related asset tag;
setting, by the one or more processors, one or more properties for each object according to properties provided in the asset list for the respective asset tag entry; and
associating, by the one or more processors, one or more databases with each object, each database corresponding to a document category, the databases containing information associated with assets having asset tag entries in the asset list.

14. The method of providing a facility plan according to claim 13 wherein the added objects are user selectable objects, and wherein on selection of an object by the user, a choice of document categories is provided, and wherein on selection of a document category by the user, the database corresponding to that document category is queried to provide the results of the query to the user.

15. A non-transitory computer readable media storing a program, which when executed by a computer performs the steps in claim 1.

16. Apparatus for providing a facility plan comprising:
(i) a processor;
(ii) a memory;
(iii) a user interface including an input device and an output device; and
(iv) software resident in memory accessible to the processor, wherein the processor executes the software to carry out the method in claim 1.

* * * * *